July 11, 1961
W. R. POSTLEWAITE
2,991,837
TURBO DRILL THRUST BEARINGS
Filed May 29, 1957
3 Sheets-Sheet 1
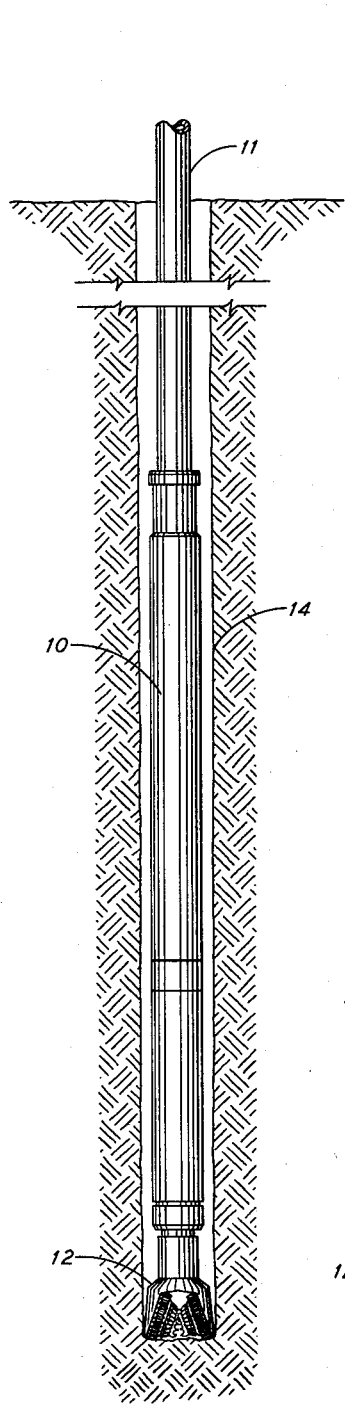
FIG.1
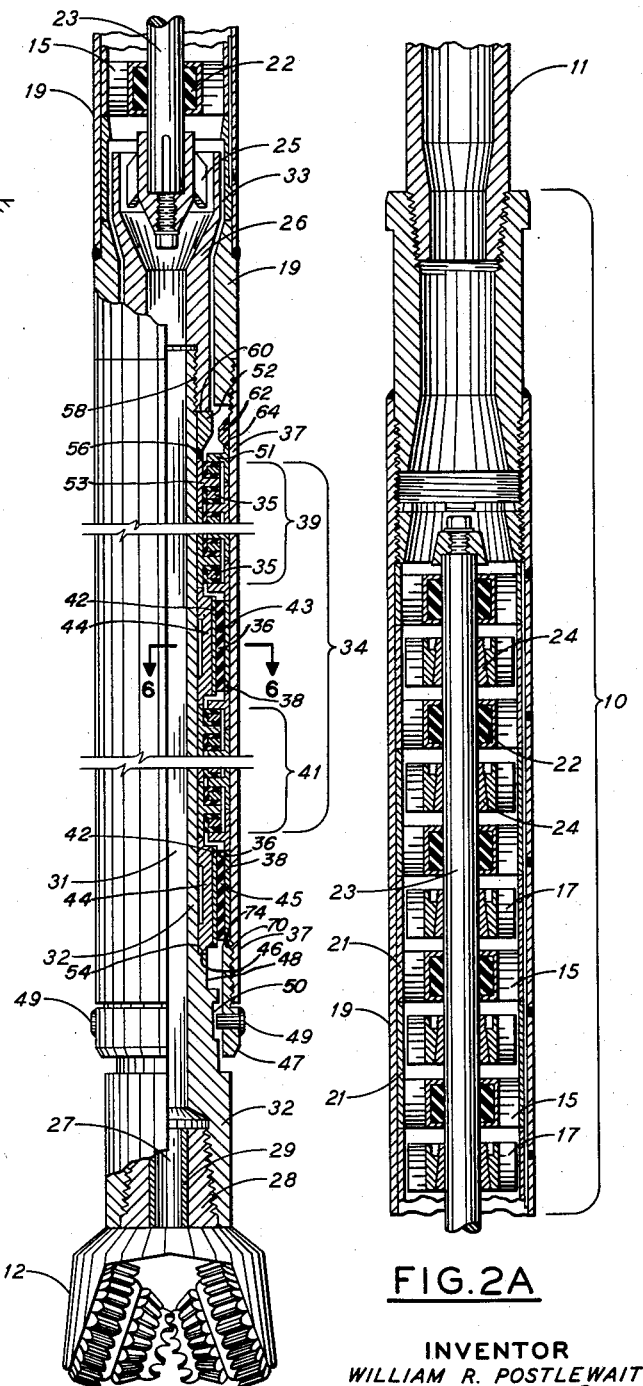
FIG.2B
FIG.2A
INVENTOR
WILLIAM R. POSTLEWAITE
BY
ATTORNEYS

INVENTOR
WILLIAM R. POSTLEWAITE
BY
ATTORNEYS

INVENTOR
WILLIAM R. POSTLEWAITE
BY
ATTORNEYS 2,991,837
TURBO DRILL THRUST BEARINGS
William R. Postlewaite, Menlo Park, Calif., assignor, by mesne assignments, of one-half to California Research Corporation, San Francisco, Calif., a corporation of Delaware, and one-half to A. O. Smith Corporation, Milwaukee, Wis., a corporation of New York
Filed May 29, 1957, Ser. No. 662,392
5 Claims. (Cl. 175—107)

The present invention relates to hydraulic turbines for rotating a drill bit at the lower end of a drill string, known in the art as turbo drills and more particularly, to apparatus for balancing the vertical thrust on a drive shaft of a multistage turbo drill, wherein such thrust is applied both by the hydraulic pressure acting downwardly on the multiple stages of turbine vanes and by the upward reaction thrust applied between the drill bit and rock at the bottom of the borehole.

The invention has for an object, the provision of an improved arrangement for counterbalancing said vertical thrust by positioning a plurality of radially disposed collar bearings between the drill bit and the lower end of the turbine. The rubbing surfaces of said plurality of collar bearings are supported alternately by an extension of the lower end of the turbine shaft and the inner surface of a sleeve member which is an extension of the turbine housing. Flow restricting means are formed in a central passageway through said turbine shaft extension to apply a predeterminable fluid pressure on the drilling fluid as it leaves the turbine to force said fluid to flow through and over said plurality of collar bearing surfaces to cool and lubricate them. In accordance with a preferred form of the invention, said bearing surfaces include intermediate annular disc members between the alternate collar bearing surfaces. The alternate collar bearings are mounted respectively to rotate with the extension of the turbine shaft and remain stationary on the extension of the turbine housing.

It has long been known that there are great advantages in both speed and cost of drilling when a turbo drill unit is used to rotate the drill bit. The most satisfactory form of such units comprises a multistage hydraulic turbine supported at the bottom of the borehole on a drilling fluid conductor pipe where the bit is directly coupled to the turbine drive shaft, preferably without speed reduction means. However, in commercial practice, use of bottom hole turbo drills of this type has been limited primarily due to failures of the bearings. As mentioned above, the turbine shaft is subjected to exceedingly large axial or vertical thrust in a downwardly direction by the high pressure drilling fluid used to drive the unit. Conversely, weight must be placed on the drill bit sufficient to cause it to penetrate hard rock formations normally encountered in drilling resulting in a vertical thrust in an upwardly direction on the turbine shaft. Since these reaction forces act in opposite directions on the turbine drive shaft, the axial thrust bearings must be capable of absorbing large thrusts in either direction. While the problem of lubricating these bearings would be relatively simple if a clean motive fluid could be used, it is also necessary to prevent "blow outs" of high pressure fluids in formations penetrated by the well bore. For this reason, it is desirable to use conventional drilling mud containing weighting materials and gelling agents. These added materials are quite expensive and it is considered necessary in commercial drilling to recirculate the drilling fluid after its initial use. However, one of the mud's primary functions is to flush up drill cuttings. Thus, when the mud is reused, it must be desanded to remove the fine abrasive particles from ground-up rock. Unfortunately, even the best commercial desanding equipment is incapable of removing all such gritty and granular material before it is returned as the motive fluid for the turbo drill.

While it has been proposed heretofore to use a plurality of rubber-covered collar thrust bearings to support the turbine drive shaft, such units have not been very successful in absorbing the vertical thrust on the turbine shaft over an even reasonable period of time, such as the normal life of the drill bit. In practice, such bearing units have lasted little longer than the metal-on-metal ball bearing units disclosed in such patents as Yost 2,348,046 and Capeliuschnicoff 1,681,094. Such previously known turbo drills, including the recently imported Russian turbo drill units, have the rubber-covered collar bearings located above the upper end of the drive shaft. The primary difficulty with such an arrangement is that there is no positive flow of the lubricating mud over the thrust bearings, and there is no forced flow of drilling fluid completely around the bearing surfaces of the turbine to cool the rubber bearing surfaces. The load on such bearings is exceedingly high. As reported in Russian technical journals, the power absorbed in the thrust bearings is about 40 horsepower in a 9¾ inch turbo with 10 tons of unbalance thrust and a speed of 700 r.p.m. Such load requires a large amount of cooling in addition to lubrication since wear on the rubber surfaces increases rapidly with increasing temperature.

In accordance with the present invention, the difficulties encountered with thrust bearings previously used in the art is to a great extent overcome by locating a plurality of collar bearings on the drive shaft between the lower end of the turbine and said drill bit to absorb the up and down axial thrust on the drive shaft. This location permits the full, undiminished force of high pressure drilling fluid to act and react with the multiple rotating and stationary stages of the turbine and at the same time provides a structure for introducing flow restricting means in the fluid passageway between the lower end of the turbine and the turbo drill. Said flow restricting means applies a predetermined back pressure on the drilling fluid between the last stage of the turbine and the jet nozzles directing fluid against the drilling bit to cool it. With said restriction, a positive pressure is applied to the drilling fluid as it leaves the turbine to force a certain portion of it to flow in a tortuous path over said plurality of radial and axial thrust absorbing collar bearing surfaces supported alternately in sandwiched relationship on the drive shaft and the turbine housing.

The bearing surfaces are covered with a durable resilient material, such as rubber, having formed therein flow passageways that assist the drilling fluid to flow over the bearing surfaces. Further, said forced lubrication not only extends the life of the resilient material, but also prevents the deposition of sand and other abrasive material on the surfaces of the bearings by positively flushing out such cuttings from these surfaces. The cooling effect of mud positively flowing over each of the bearing surfaces makes possible the absorption of a greater energy loss in the bearings so that more weight can be used on the drill bit and higher mud pressure can be used than would be possible with the said plurality of collar thrust bearing surfaces located above the turbine.

In a preferred manner of carrying out the present invention, the relative speed of rotation between the opposed collar bearing surfaces on the shaft and housing is reduced by interpositioning annular disc or washer members between at least some of the rubbing surfaces of the axial thrust bearing elements. Such disc members permit the opposed rotating and stationary radially disposed bearing surfaces to have an effective, or relative, speed of only about one-half of what it would be if such annular discs were not used.

Further objects and advantages of the present invention will become apparent from the following detailed specification taken in conjunction with the accompanying drawings which form an integral part of the present application.

Referring now to the drawings:

FIG. 1 is an assembly view of a turbo drill unit including a drill bit supported on the lower end of a drill pipe as said bit is making a hole in the earth;

FIG. 2A is a cross-sectional vertical view through the upper end of the multistage turbo drill unit and the lower end of the drill pipe to which it is connected;

FIG. 2B is the lower extension of the vertical view of the turbine unit shown in FIG. 2A, partially in cross-section, illustrating a preferred form of multiple collar bearing surfaces as related to the construction of the turbine drive shaft and the drill bit;

Figure 6:
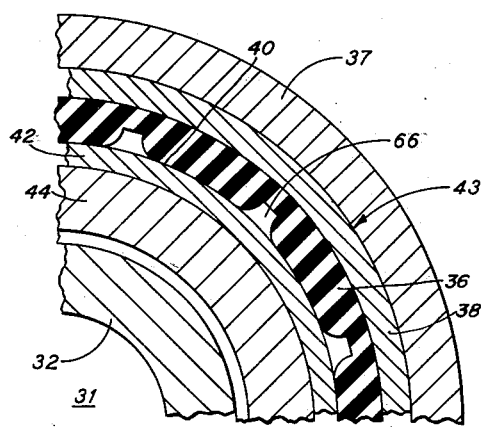
FIG. 6 is an enlarged cross-sectional view of the axial thrust bearing intermediate the upper and lower part of the radial thrust bearings illustrated in FIG. 2B in the direction of arrows 6—6.

Referring now to the drawings and in particular FIG. 1, there is illustrated the method of drilling with a downhole turbine unit 10, known in the art as a turbo drill. Turbo drill 10 is supported on the lower end of a section of drill pipe 11 and rotates drill bit 12, illustrated as a conventional 2-cone unit. Hydraulic fluid is supplied by pipe 11 to rotate turbine unit 10, which as will be explained more fully hereinafter, is directly connected to bit 12. Fluid is pumped down through pipe 11 under pressure so that it not only rotates the drive shaft of turbine 10 but also flows downwardly under sufficient pressure to lubricate bit 12, cool the cutting surfaces, and flush the cuttings from the bottom of the well bore.

As indicated above, the return drilling fluid is then sent through a "shale shaker" to eliminate the cuttings and then is normally treated further to remove finer granular particles before it is reused. This operation is called "desanding" since the remaining particles are usually of quartz origin. Even with the best cleaning of the drilling fluid within economic limitations, the fluid contains considerable amounts of abrasive material when it is returned as the motive power for the hydraulic turbine. As best indicated in FIG. 2A, the drilling fluid enters turbine 10 through the lower end of drill pipe 11 and then alternately passes through a plurality of rotary and stationary vanes, or stages in the turbine comprising stator blades 15 and the turbine rotor blades 17. For a complete description of the construction of stator blades 15 and their spaced assembly in housing 19, reference is made to Yost Patent 2,306,583. As there described, each of the stator blades is mounted on a collar 21 that spaces the individual stator blades the proper distance apart within housing 19. The intermediate space is occupied by turbine rotor blades 17. Each stator blade assembly includes a radial guide bearing member 22 that holds the rotor shaft in alignment.

The preferred assembly of turbine rotor blades 17 on rotor shaft 23 is also disclosed in Patent 2,306,583. As shown, each rotor blade assembly is held on the shaft by a tapered collar member indicated as 24.

When the fluid passes through and over the alternate stages of stator and rotor blades, shaft 23 rotates and spent drilling fluid is discharged downwardly so that it is directed against the cutting surfaces of drill bit 12 and the bottom of the borehole.

The large up and down vertical or axial thrust on turbine rotor shaft 23 must be restrained by a thrust bearing assembly. Heretofore, such axial thrust bearings have included roller, or ball bearings mounted either at the top of the rotor shaft or between the lower end of the rotor shaft and drill bit. Similarly, multiple collar thrust bearings have been used at the upper end of the rotor shaft where the rubbing surfaces are in the environment of the drilling fluid but no positive pressure is applied across the bearing to force fluid flow over the bearing surfaces. In accordance with the present invention, positive pressure is applied to the drilling fluid only after downward flow through the turbine has been undisturbed. Then, outflow fluid from the turbine, after full use has been made of the applied pressure, is used to cool and lubricate the collar bearings. Said positive flow for cooling and lubricating the bearing surfaces is developed in the central flow passage 31 through rotating, elongated-sleeve member 26, secured to the lower end of rotor shaft 23 by webs 25. The member 26 is a drive shaft connecting the turbine with the drill bit. As shown in FIG. 2B, the passageway for outward flow of the drilling fluid from the turbine also includes a throttling means, such as central opening 27 in sleeve member 29 fixedly inserted into the upper extension 28 of bit 12. Said opening forms flow restricting means and the flow area of the opening can be selected to apply a predeterminable back pressure on fluid flowing downwardly through center passageway 31 in downward extension 32 of drive shaft 26. The back pressure is derived both from the size of opening 27 in sleeve 29 and the length and diameter of passageway 31. The purpose of such back pressure is to force fluid leaving the last stage 15 of turbine 10 to flow through an annular restricted flow passageway 33 formed by the outer surface of drive shaft 26 and the downward extension of housing 19. Such fluid is then forced by pressure to flow in a tortuous path, both radially and axially over the work surfaces of the multistage radial bearing, designated generally by numeral 34.

As shown in FIG. 2B and as will be more fully described later, the relative speed between each of the radially disposed bearing surfaces is reduced by about one-half by positioning a respective annular disc or washer member 35 circumferentially surrounding the drive shaft extension 32 and intermediate each of the radial bearing surfaces of the complementary collar bearing members. Thus, one of said annular discs is placed between each pair of radially directed bearing surfaces of complementary and rotary collar bearing members. The disc members 35 are free of a fixed connection to the drive shaft extension 32, the inner surface of turbine housing extension 37, and the complementary radially disposed bearing surfaces of the collar bearing members. Thus, they are floating in the assembly. Said collar bearing members in turn are supported alternatively in their order of assembly by the outer diameter of drive shaft extension 32 and by the inner surface of turbine housing extension 37. Due to the number of stages of bearings in the present embodiment, said plurality of radially disposed bearing surfaces are divided into two groups designated as an upper assembly 39 and a lower assembly 41. In this way there can be positioned intermediate the upper and lower assemblies 39 and 41 a radial-alignment bearing section, designated as 43, that helps maintain radial alignment of rotor shaft 23 and drive shaft 26. Where the length of the assembly is not so great as to require lateral stability, radial bearing 43 can be omitted. Additionally, axially elongated bearing 43 aligns each of the thrust bearings and prevents undue wear between the rubbing surfaces of these bearings. A similar radial bearing 45 is positioned below lower bearing assembly 41 to align radially drive shaft extension 32 with housing extension 37. Bearing 45 bears the brunt of radial whipping imposed on the drive shaft and collar bearings by the drill bit drilling against the bottom of the borehole.

The radial bearings 43 and 45 are formed in a similar manner and the same numerals will be used to refer to corresponding parts in each of these bearings. Each radial bearing is formed with a resilient material 36, such as rubber, affixed to a cylinderical backing ring 38 which is proportioned to fit slidably within the housing extension 37 in a manner similar to the bearing members 51. The resilient material circumferentially surrounds the drive shaft extension 32 and the bearing surface 40 of the resilient material 36 bears in sliding relationship against the circumferential hardened outer surface of a cylindrical bearing collar 42 which is firmly affixed to a supporting base collar member 44. The base collar 44 is proportioned in its inner periphery to be slidably mounted on the drive shaft extension 32 in a manner similar to the collar bearing members 53.

The bearing components mounted on the drive shaft extension 32 are clamped to it between the radially extending shoulder 46 of the diametrically enlarged portion 48 which is formed integrally on the lower end portion of the drive shaft extension, and the annular collar member 52 which is slidably mounted over the upper end portion of the drive shaft extension. The shoulder 46 abuts the lower end surface 54 of the base collar member 44 of radial bearing assembly 45 and the lower end surface 56 of collar 52 abuts the upper end surface of the topmost one of the collar members 53. The drive shaft extension 32 is connected in axial alignment by screw threads 58 to the elongated sleeve member 26 and when these parts are threaded together a radially extending lower end surface 60 on the sleeve member 26 engages the collar 52 and forces it downwardly relative to the fixed enlarged portion 48 of the drive shaft extension. Since the respective bearing components initially are slidably mounted on the drive extension the relative motion of the collar 52 toward the fixed shoulder 46 forces the parts together in a longitudinal or axial direction and securely clamps the complementary bearing components to the drive shaft extension when the parts are assembled together.

In a similar manner the respective bearing components mounted on the inner wall of the turbine housing extension 37 are clamped to it between a radially inwardly projecting ring 62 which is affixed to the inner wall of the turbine housing extension in the upper end portion thereof to abut the upper end surface 64 of the topmost collar member 51, and the radially inwardly projecting upper end surface 70 of the safety collar 47 which abuts the lower end surface 74 of the cylindrical backing ring 38 of radial bearing assembly 45. The safety collar 47 is connected by screw threads to the lower end of the turbine housing extension 37 and when this connection is made up the complementary bearing components are forced together in an axial direction and are securely clamped to the turbine housing extension.

Drilling fluid passes over each of the turbo drill bearing assemblies 39, 43, 41 and 45 in succession and is discharged through the annular passage between retaining or safety collar 47 on housing extension 37 and the drive shaft. Retaining collar 47 prevents loss of the drive shaft and bit in the event of failure of drive shaft 26 above that point. A full description of this safety collar 47 is contained in Yost Patent 2,301,105. As indicated in FIG. 2B, three pins 49 extend through retaining collar 47 and normally ride intermediate the ends of an undercut groove 50 formed in the outer surface of the lower end of drive shaft extension 32.

Figure 3:
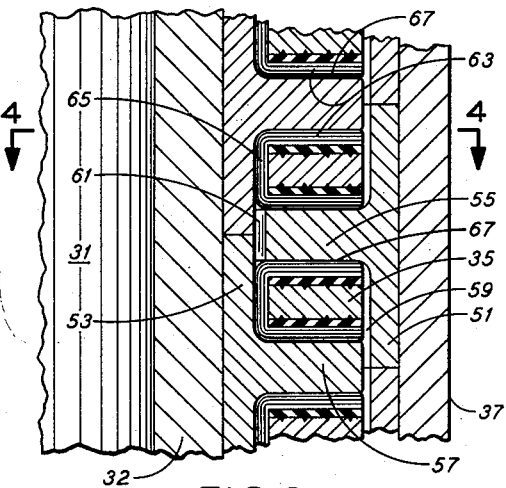
FIG. 3 is an enlarged and detailed vertical sectional view of a part of the bearing construction shown in FIG. 2B, taken in the direction of the arrows 3—3 of FIG. 4.
Figure 4:
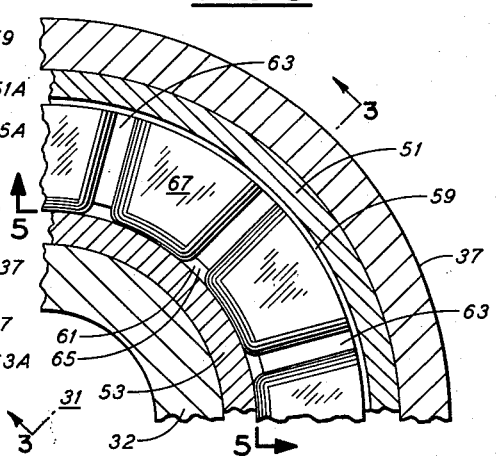
FIG. 4 is a cross-sectional plan view of that part of the bearing structure shown in FIG. 3, taken in the direction of arrows 4—4.
Figure 5:
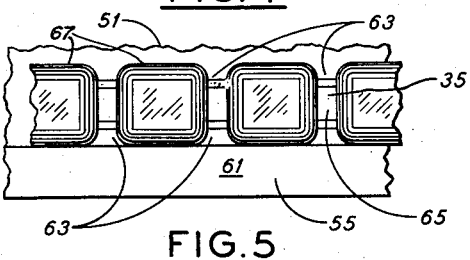
FIG. 5 is a developed vertical side view of one of the bearing members shown in FIG. 4, taken around its inner circumference in the direction of arrows 5—5.

The preferred form of the individual stages of the plurality of the radially disposed bearing units is best seen in FIGS. 3, 4 and 5. As there shown, the alternate stages of the stationary and rotating bearing surfaces are supported by housing extension 37 and drive shaft extension 32; each is formed as a collar member, respectively identified as 51 and 53. As further shown in FIG. 3, collars 51 have an inwardly directed flange section 55 that serves as the axial thrust surface, while rotating collar 53 has a cooperating outwardly turned flange 57. Thus the radially disposed interengaging surfaces of the flanges 55 and 57 form the collar bearing surfaces. The outer diameter of flange member 57 and the inner diameter of flange 55 are such that axial flow passageways 59 and 61 are formed between the successive stages to permit free flow of drilling fluid therethrough.

As indicated earlier, the bearing surfaces on flanges 57 and 55 between the rotating and stationary collar members 53 and 51, respectively, have assembled between them a floating annular disc or washer member 35 that has a resilient bearing surface 67 on both of its radially extending sides and on its inner peripheral edge. Preferably, said surfaces 67 are molded of rubber, and both radially disposed sides have a plurality of radial flow passageways 63 formed in the bearing surface. It will be seen from the sectional view illustrated by FIG. 3 of the drawings, which view is taken along a radial plane cutting through the assembly along the bottom of one of the radial passageways 63 of the resilient wearing surface, as indicated by the arrows 3—3 of FIG. 4, that the resilient surface preferably is continuous throughout the radially disposed areas of the disc member. The resilient layer is made with a thinner cross section in the region of the radial passageway 63 to provide a channel indented into the wearing surface of the member.

As indicated in FIG. 4, said radial passageways interconnect with axial-flow passages 59 and 61. Further, to assist fluid flow over, around and through the bearing surfaces, the inner circumferential resilient surface of each of discs 35 is further provided with enlarged, vertical flow passageways 65 formed therein.

A particular advantage of the arrangement of bearing structure shown in FIGS. 2B, 3, 4 and 5, lies in both the ease of assembly and the wear characteristics, or load-life quality, during operation of the turbine. With said construction, the rotating and stationary collar members 53 and 51, respectively, are formed entirely of metal and assembled into housing extension 37 and on shaft extension 32, with insertion of a similar disc member 35 between each stage of the bearing assembly. Further, bearing wear of the assembly will occur primarily on the resilient surfaces of said disc members 35, rather than on the rubbing surfaces of flanges 57 and 55 which are hard faced to reduce the wear thereon. Thus, replacement cost is limited to the cheaper units, discs 35. The turbo bearing unit can also be readily disassembled and disc or washer members 35 replaced without requiring as accurate alignment of the shaft and housing extensions as would be necessary with rubbing surfaces of flanges 57 and 55 in direct contact. Still a further advantage of considerable importance in the present arrangement, is the relative speeds of rotation of the radially disposed bearing surfaces. As indicated before, it is desirable to be able to operate the turbo drill at maximum load and as near maximum speed as possible for the greatest rate of penetration of hard rock formations. Hence, wear on the bearing surfaces will be dependent upon the relative speed of said bearing surfaces. While it is desired to have a maximum area on said surfaces to reduce the number of stages required in bearing assembly, greater diameter of the bearing sections increases the linear speed of the opposed parts of the bearing surfaces. Accordingly, the present structure that includes idler or floating discs 35 is highly desirable because the linear velocity between the contacting radially disposed bearing surfaces will be only about one-half of the true speed between the rotating and stationary members. This is due to fluid drag on bearing discs 35. Such fluid drag adjacent the relatively moving surfaces is of course opposite in direction and reduces the relative speed on each bearing surface to about one-half the value it would otherwise have.

Positive flow of fluid through axially-elongated radial guide bearing 43 is assisted by vertical flow passages 66 formed in the bearing surface 40 of the resilient material 36, as particularly illustrated in FIG. 6. The arrangement of lower bearing 45 in FIG. 2B is of course substantially identical to that of bearing member 43.

Figure 7:
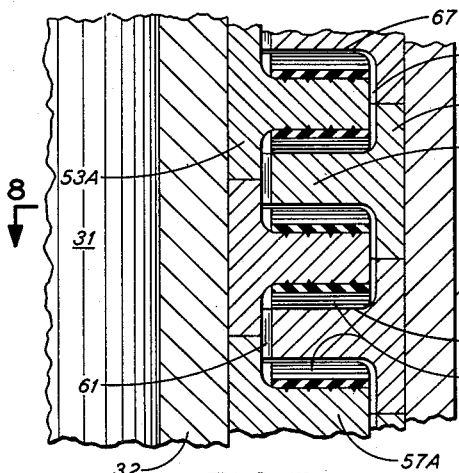
FIG. 7 is a vertical sectional view taken in the direction of the arrows 7—7 of FIG. 8, similar to FIG. 3, illustrating an alternative embodiment of the thrust bearing construction wherein the alternate directly opposed bearing surfaces are mounted respectively on the turbine shaft and housing.
Figure 8:
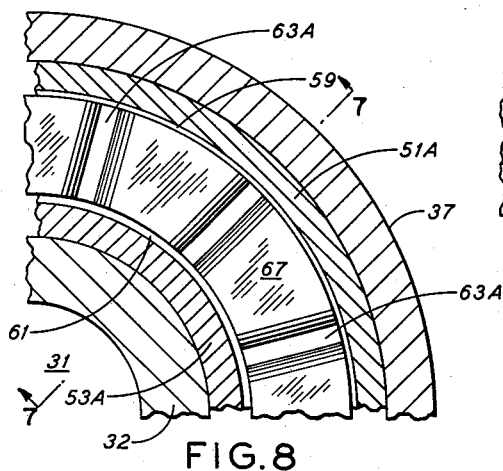
FIG. 8 is a vertical view of the arrangement shown in FIG. 7, similar to FIG. 4 and taken in the direction of arrows 8—8.

Referring now to the arrangement of FIGS. 7 and 8, there is illustrated an alternative construction of the multiple stages of the thrust bearing members similar to that shown in FIGS. 3 and 4. In this embodiment, the outer and stationary flange members 55A are identical with those shown in FIG. 3 and are mounted on housing extension 37 in the same manner. The inner and rotating flange members 57A differ from those in FIG. 3 by having formed thereon the resilient surface 67 which corresponds to the resilient radially disposed bearing surface shown in the embodiment of FIG. 3 formed on disc members 35. The fluid flow passages through and around the radially disposed flanges 55A and 57A are substantially similar to those illustrated in FIG. 4. The radial passageways are indicated as 63A.

Figures 9, 12:
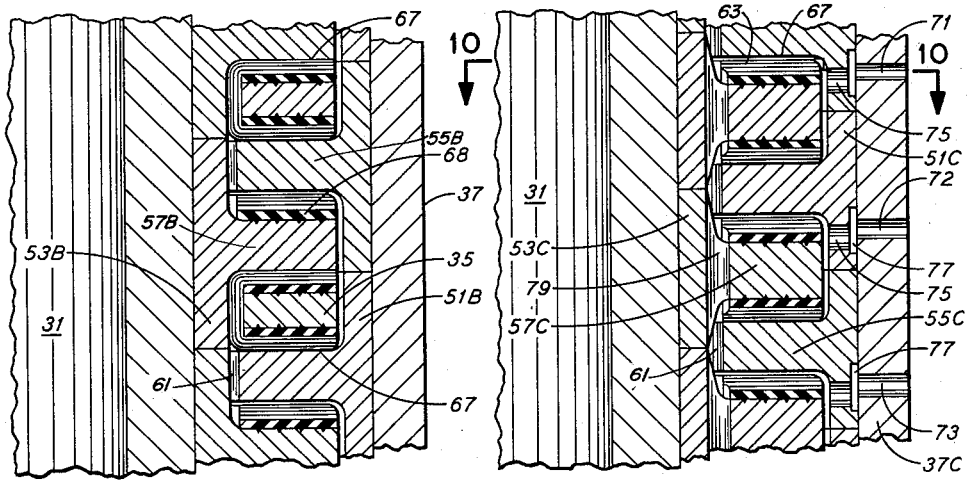
FIG. 9 is a vertical sectional view of another alternative construction of the collar bearing members, particularly illustrating a method of forcing radial fluid flow over each stage of the multiple-bearing surfaces.
FIG. 12 is similar to FIGS. 3 and 7 and is a vertical elevational view showing still another embodiment of the axial thrust bearings constructed in accordance with the present invention.

The construction of still another embodiment is illustrated in FIG. 12 that is similar to those shown in FIGS. 3 and 7 and employs collar members 51B and 53B from which extend, respectively, radially disposed flanges 55B and 57B. However, in this embodiment, disc members 35 are interposed between alternate stages of the radially disposed flanges extending from collar members 51B and 53B to take up the downward thrust imposed on the drive shaft 26 by the turbine which in normal operation far exceeds the upward thrust imposed on the shaft 26 by the bit. Thus, the upper bearing surface 68, on the rotating collar bearing surface 57B is covered with resilient material, while both upper and lower surfaces of disc members 35 are similarly covered, as in FIG. 3. The flow passages through and around succeeding stages of the multiple disc bearings are substantially similar to the flow passages illustrated in FIGS. 4 and 5.

Figure 10:
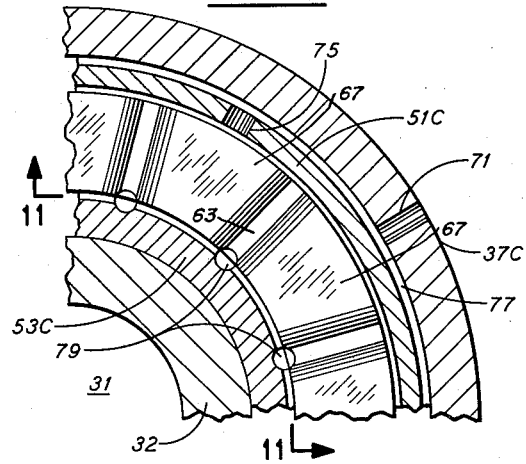
FIG. 10 is a partial plan view of a part of the bearing construction shown in FIG. 9 taken in the direction of arrows 10—10.
Figure 11:
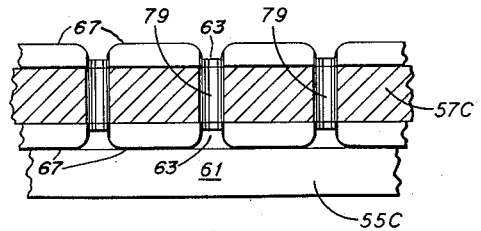
FIG. 11 is a developed side elevational view taken along the inner circumference of the bearing member shown in FIG. 10 in the direction of arrows 11—11.

There is shown in a further embodiment of the present invention in FIGS. 9 to 11 inclusive, an alternative system for obtaining radial flow over individual stages of the collar bearing surfaces on flanges 55C and 57C. In said embodiment a plurality of radial passageways identified as 71, 72 and 73 are drilled through the side wall of turbine housing extension 37C. As indicated, these radial flow passageways are of increasing diameter from top to bottom. While the diameters over the three stages do not vary as greatly between adjacent stages, indicated as in FIG. 9, the trend of said increase in size is illustrated therein. The purpose of such an arrangement is to insure substantially the same flow of drilling fluid in a radial direction through opening 73 as will occur through 72 and 71 under higher pressure. The quantity of flow therethrough is, of course, a function of both pressure and area.

In the embodiment of FIGS. 9 to 11 inclusive, stationary collar members 51C are similar to those shown in the other embodiments of the invention, but include radial flow passageways indicated as 75, that communicate with an annular space, formed in the radially outer surface of collar 51C, and identified as passageway 77. A further modification of flow passageways through the bearing assembly is provided by a plurality of axial holes 79 drilled through the flange portions 57C of rotating collar members 53C. One particular advantage of the arrangement of FIGS. 9 to 11 is that even if fairly large granular particles enter the fluid passages flow is not blocked around and over the bearing surfaces, since the particles can be flushed by drilling fluid pressure and forced out radial passageways 71, 72, etc. through housing wall 37C. In this modification of the invention both the upper and lower surfaces of the flange portions 57C of rotating collar members 53C have affixed to them a resilient bearing surface 67 of molded rubber in which is formed a plurality of radial flow passages 63 in the manner described heretofore.

From the foregoing detailed description of several embodiments of the present invention, it will be apparent that there is provided a multiple collar thrust bearing assembly positioned between the lower end of the turbine unit and the drill bit, so that a predetermined fluid pressure can be applied through outflow passages for the drilling fluid from the turbine to force said fluid to act primarily as a coolant for the work surfaces of said bearing when said bearing surfaces are rotated at speeds such that maximum load and torque can be continuously applied to the drilling bit, while wear on the thrust bearing means is maintained at a minimum.

Various modifications and changes in both the construction of the bearing units and fluid flow arrangements through the turbine and bearing assembly will become apparent to those skilled in the art from the foregoing specification. Among such changes is the constricting of central flow passageway 31 to produce the back pressure required without use of sleeve member 29. As mentioned above, the diameter and length of bore 31 can be regulated to impose the predetermined back pressure. All other modifications and changes falling within the scope of the appended claims are intended to be included therein.

I claim:

1. A bearing structure for an earth drilling apparatus which employs a down hole turbine using drilling mud as a motive fluid to rotate a drill bit connected to said turbine comprising a housing for the turbine, a drive shaft connecting the rotating portion of said turbine and the drill bit actuated thereby, a conduit extending longitudinally through said drive shaft to conduct drilling mud from the interior of said housing to said drill bit, a cylindrical sleeve concentric with said drive shaft and spaced radially apart therefrom to provide an annular chamber disposed axially along said drive shaft to receive a bearing assembly, means to affix said sleeve at one end to said housing to maintain said sleeve relatively stationary when said drive shaft is rotated by said turbine, a passageway connecting said annular chamber and the interior of said housing to conduct drilling mud to said annular chamber, means to control the flow of drilling mud through said conduit in said drive shaft to thereby control the pressure in the drilling mud conducted to said annular chamber, a first plurality of similar axially spaced circumferential collar bearing members separately detachably affixed to the exterior surface of said drive shaft and extending radially outwardly toward said cylindrical sleeve and terminating in a radially spaced-apart relationship to the inner wall of said sleeve to form a passageway between the radially outer circumference of said first plurality of collar bearing members and the inner wall of said sleeve, a second plurality of similar axially spaced circumferential collar bearing members separately detachably affixed to the inner wall of said sleeve and extending radially inwardly toward and in radially spaced-apart relationship to said drive shaft and positioned with individual collar bearing members of said second plurality alternating in axially disposed sequence with individual collar bearing members of said first plurality, the said radially spaced-apart relationship between said radially inwardly extending second plurality of collar-bearing members and said drive shaft forming a passageway between the radially inner circumference of said second plurality of collar bearing members and the outer circumference of said drive shaft, annular disc elements interposed between at least some of the radially extending complementary collar bearing members with each of said annular disc elements circumferentially surrounding said drive shaft and free of a fixed connection with said drive shaft and said inner wall of said sleeve and said collar bearing members and movable in a circumferential direction relative to said collar bearing members, a resilient material interposed between each of the radially disposed adjacent complementary bearing surfaces of the bearing assembly, channels formed in said resilient material for the passage of drilling mud therethrough, and a passageway from said annular chamber to the exterior of said cylindrical sleeve to permit drilling mud under pressure to be forced through the bearing assembly and over the bearing surfaces.

2. A bearing structure in accordance with claim 1, wherein the passageway from said annular chamber to the exterior of said cylindrical sleeve comprises a plurality of axially spaced openings formed radially through said sleeve and the cross-sectional area of individual openings of said plurality is proportioned to maintain a substantially constant pressure in the drilling mud throughout the bearing assembly.

3. A bearing structure in accordance with claim 1, in which said annular disc elements are interposed between each pair of said radially disposed collar bearing surfaces and said resilient material is affixed to the radially disposed surfaces of said annular disc elements.

4. A bearing structure in accordance with claim 1, wherein the said annular disc elements are interposed between alternate complementary pairs of said radially disposed collar bearing surfaces and positioned in the bearing assembly to support thrust loads generated by said turbine.

5. A thrust bearing assembly comprising a rotating shaft, a stationary concentric sleeve circumferentially surrounding and radially spaced apart from said shaft, a first plurality of similar circumferential collar bearings separately detachably affixed to said shaft and extending radially outwardly therefrom and terminating in a radially spaced-apart relationship to the inner wall of said sleeve to form an annular space between the radially outwardly circumference of each of said first plurality of collar bearings and said sleeve, a second plurality of similar circumferential collar bearings affixed separately detachably to said sleeve and extending radially inwardly therefrom and terminating in radially spaced-apart relationship to said shaft and positioned with the individual collar bearings of said first and said second plurality alternating in axially disposed sequence, the said radially spaced-apart relationship to said shaft of the inwardly extending said second plurality of collar bearings forming an annular space between the radially inwardly circumference of each of said second plurality of collar bearings and said shaft, floating annular discs interposed between axially adjacent radial surfaces of said first plurality and said second plurality of collar bearings with each of said annular discs circumferentially surrounding said shaft and free of a fixed connection with said shaft and said sleeve and said collar bearings and movable in a circumferential direction relative to each of said adjacent radial surfaces, a resilient material interposed between adjacent radially disposed surfaces of said collar bearings and said discs to form bearing surfaces for loads applied in an axial direction between said shaft and said sleeve, said resilient material having radially disposed passageways formed in it communicating with the said annular space between the said first plurality of collar bearings and said sleeve and the said annular space between the said second plurality of collar bearings and said shaft and means to admit a lubricating and cooling fluid under pressure through the said annular spaces and the said radially disposed passageways of the bearing assembly.

References Cited in the file of this patent

UNITED STATES PATENTS

| | | |
|---|---|---|
| 1,681,094 | Capeliurchnicoff | Aug. 14, 1928 |
| 1,965,564 | Bannister | July 10, 1934 |
| 2,301,105 | Yost | Nov. 3, 1942 |
| 2,306,583 | Yost | Dec. 29, 1942 |
| 2,348,047 | Yost | May 2, 1944 |